United States Patent
Martin

(10) Patent No.: US 10,618,772 B2
(45) Date of Patent: Apr. 14, 2020

(54) ELEVATOR TERMINATION ASSEMBLY THAT PROVIDES AN INDICATION OF ELEVATOR CAR LOAD

(71) Applicant: OTIS ELEVATOR COMPANY, Farmington, CT (US)

(72) Inventor: Kyle B. Martin, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 389 days.

(21) Appl. No.: 15/627,787

(22) Filed: Jun. 20, 2017

(65) Prior Publication Data

US 2018/0362294 A1 Dec. 20, 2018

(51) Int. Cl.
*B66B 1/34* (2006.01)
*B66B 7/08* (2006.01)
*B66B 7/10* (2006.01)
*G01G 19/18* (2006.01)
*F16G 11/04* (2006.01)
*F16G 11/02* (2006.01)

(52) U.S. Cl.
CPC ............ *B66B 1/3484* (2013.01); *B66B 7/085* (2013.01); *B66B 7/10* (2013.01); *G01G 19/18* (2013.01); *F16G 11/025* (2013.01); *F16G 11/046* (2013.01)

(58) Field of Classification Search
CPC .......... B66B 1/3438; B66B 7/085; B66B 7/10
USPC ....................................................... 187/394
See application file for complete search history.

(56) References Cited

U.S. PATENT DOCUMENTS

| | | | |
|---|---|---|---|
| 4,986,391 A | 1/1991 | Salmon | |
| 5,421,433 A | 6/1995 | Yoo | |
| 6,021,873 A * | 2/2000 | Aulanko | B66B 1/3484 187/411 |
| 6,123,176 A * | 9/2000 | O'Donnell | B66B 7/1215 187/393 |
| 6,450,299 B1 * | 9/2002 | Lysaght | B66B 1/3484 187/393 |
| 6,483,047 B1 * | 11/2002 | Zaharia | G01G 19/18 177/142 |
| 7,237,656 B2 | 7/2007 | Barrett et al. | |

(Continued)

FOREIGN PATENT DOCUMENTS

CN 201647768 U 11/2010
CN 101920875 A 12/2010

(Continued)

OTHER PUBLICATIONS

Examination Report No. 1 for AU Application No. 2018203643 dated Nov. 2, 2018.

(Continued)

*Primary Examiner* — David S Warren
(74) *Attorney, Agent, or Firm* — Carlson, Gaskey & Olds

(57) ABSTRACT

An illustrative example assembly for determining a load on an elevator car includes a plurality of terminations respectively configured for securing an end of a load bearing member. A plurality of strain gages are respectively secured to a portion of respective ones of the plurality of terminations so that each of the terminations includes at least one of the strain gages. A load determining processor receives indications from the plurality of strain gages and determines a load on the elevator car based on the received indications.

12 Claims, 2 Drawing Sheets

(56) References Cited

U.S. PATENT DOCUMENTS

| | | | |
|---|---|---|---|
| 7,493,834 B2* | 2/2009 | Gonzalez Gallegos | B66B 1/3484 177/211 |
| 7,703,578 B2* | 4/2010 | Kugiya | B66B 5/12 187/390 |
| 8,047,335 B2* | 11/2011 | Fargo | B66B 7/10 187/411 |
| 8,162,110 B2* | 4/2012 | Smith | B66B 7/10 187/266 |
| 8,376,090 B2* | 2/2013 | Kostka | B66B 5/021 187/281 |
| 9,617,116 B2* | 4/2017 | Brugger | B66B 1/3476 |
| 9,650,227 B2* | 5/2017 | Kalliomaki | B66B 7/064 |
| 2004/0143940 A1* | 7/2004 | Bass | B66B 7/08 24/136 R |
| 2009/0139802 A1* | 6/2009 | Maki | B66B 1/3484 187/393 |
| 2012/0061190 A1* | 3/2012 | Brugger | B66B 1/3476 187/414 |
| 2014/0167980 A1* | 6/2014 | Sonneborn | B66B 7/10 340/870.02 |
| 2015/0166305 A1 | 6/2015 | Kalliomakii | |
| 2018/0251343 A1* | 9/2018 | Hakala | B66B 1/32 |
| 2018/0305187 A1* | 10/2018 | Kosterke | B66C 13/16 |
| 2018/0312384 A1* | 11/2018 | White | B66F 9/183 |
| 2018/0339891 A1* | 11/2018 | Ijadi-Maghsoodi | B64D 1/22 |
| 2018/0362294 A1* | 12/2018 | Martin | B66B 1/3484 |

FOREIGN PATENT DOCUMENTS

| | | |
|---|---|---|
| EP | 0849207 | 6/1998 |
| EP | 3210924 | 8/2017 |
| JP | H0398975 A | 4/1991 |
| JP | H06255933 A | 9/1994 |
| JP | 2005519009 | 6/2005 |
| JP | 2011042481 | 3/2011 |
| JP | 2014210656 | 11/2014 |
| JP | 2015086026 A | 5/2015 |
| JP | 2015086027 | 5/2015 |
| JP | 2016055999 | 4/2016 |
| JP | 2016141552 | 8/2016 |
| KR | 20040011060 | 2/2004 |
| KR | 100923174 B1 | 10/2009 |
| WO | 03074406 | 9/2003 |
| WO | WO2004089802 A1 | 10/2004 |
| WO | WO2007144456 A1 | 12/2007 |

OTHER PUBLICATIONS

Extended European Search Report for EP Application No. 18178539.5, dated Nov. 12, 2018.

Office Action for Korean Patent Application No. 10-2018-0068003 dated Jun. 20, 2019.

Notice of Reasons for Rejection for Japanese Patent Application No. 2018-115685 dated Jun. 6, 2019.

* cited by examiner

ELEVATOR TERMINATION ASSEMBLY THAT PROVIDES AN INDICATION OF ELEVATOR CAR LOAD

BACKGROUND

Elevator systems utilize information regarding the load of an elevator car for several purposes. Most car load determining arrangements utilize load sensors situated on the elevator car. As the number of passengers within the elevator car changes, the output from the load sensors changes providing an indication of the change in load on the car.

While such arrangements have proven useful, those skilled in the art are always striving to make improvements. Additionally, with changes in other elevator components, such as the roping load bearing members, needs arise for different or enhanced load determining arrangements.

SUMMARY

An illustrative example assembly for determining a load on an elevator car includes a plurality of terminations respectively configured for securing an end of a load bearing member. A plurality of strain gages are respectively secured to a portion of respective ones of the plurality of terminations so that each of the terminations includes at least one of the strain gages. A load determining processor receives indications from the plurality of strain gages and determines a load on the elevator car based on the received indications.

In an example embodiment having one or more features of the assembly of the previous paragraph, the plurality of terminations respectively include a rod, a socket portion connected to the rod and a wedge situated at least partially within the socket portion. The strain gages are situated on at least one of the rod or the socket portion of the respective one of the plurality of terminations.

In an example embodiment having one or more features of the assembly of either of the previous paragraphs, the socket portion includes at least one solid member that extends in a direction of the load on the elevator car and the strain gages are situated on the at least one solid member.

In an example embodiment having one or more features of the assembly of any of the previous paragraphs, the load determining processor determines a load value corresponding to a strain gage indication from each of the plurality of terminations and determines the load on the elevator car from a total of the determined load values.

In an example embodiment having one or more features of the assembly of the previous paragraph, the load determining processor determines whether the load on the elevator car is equally distributed among the respective load bearing members.

An illustrative example elevator system designed according to an embodiment of this invention includes an elevator car, a plurality of load bearing members suspending the elevator car, a plurality of terminations respectively securing an end of a respective one of the load bearing members, a plurality of strain gages respectively secured to a portion of respective ones of the plurality of terminations so that each of the terminations includes at least one of the strain gages, and a load determining processor that determines the load on the elevator car from indications from the strain gages. The respective indications from the strain gages correspond to a load on the respective one of the load bearing members.

In an example embodiment having one or more features of the elevator system of the previous paragraph, the plurality of terminations respectively include a rod, a socket portion connected to the rod and a wedge situated at least partially within the socket portion. The strain gages are situated on at least one of the rod or the socket portion of the respective one of the plurality of terminations.

In an example embodiment having one or more features of the elevator system of either of the previous paragraphs, the socket portion includes at least one solid member that extends in a direction of the load on the elevator car and the strain gages are situated on the at least one solid member.

In an example embodiment having one or more features of the elevator system of any of the previous paragraphs, the load determining processor determines a load value corresponding to a strain gage indication from each of the load bearing members and determines the load on the elevator car from a total of the determined load values.

In an example embodiment having one or more features of the elevator system of any of the previous paragraphs, the load determining processor determines whether the load on the elevator car is equally distributed among the respective load bearing members.

In an example embodiment having one or more features of the elevator system of any of the previous paragraphs, the load bearing members comprise belts having carbon fiber tension members within a jacket.

In an example embodiment having one or more features of the elevator system of any of the previous paragraphs, the elevator car is situated in a hoistway, the hoistway includes a hitch plate in a selected position in the hoistway, and the terminations are secured to the hitch plate.

In an example embodiment having one or more features of the elevator system of any of the previous paragraphs, the elevator car includes a cross beam and the terminations are secured to the cross beam.

An example embodiment having one or more features of the elevator system of any of the previous paragraphs includes a machine. The plurality of load bearing members move responsive to operation of the machine to cause movement of the elevator car.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention provide the ability to determine the load on an elevator car by measuring strain at a termination that secures an end of a load bearing member that supports or suspends the elevator car.

Figure 1:
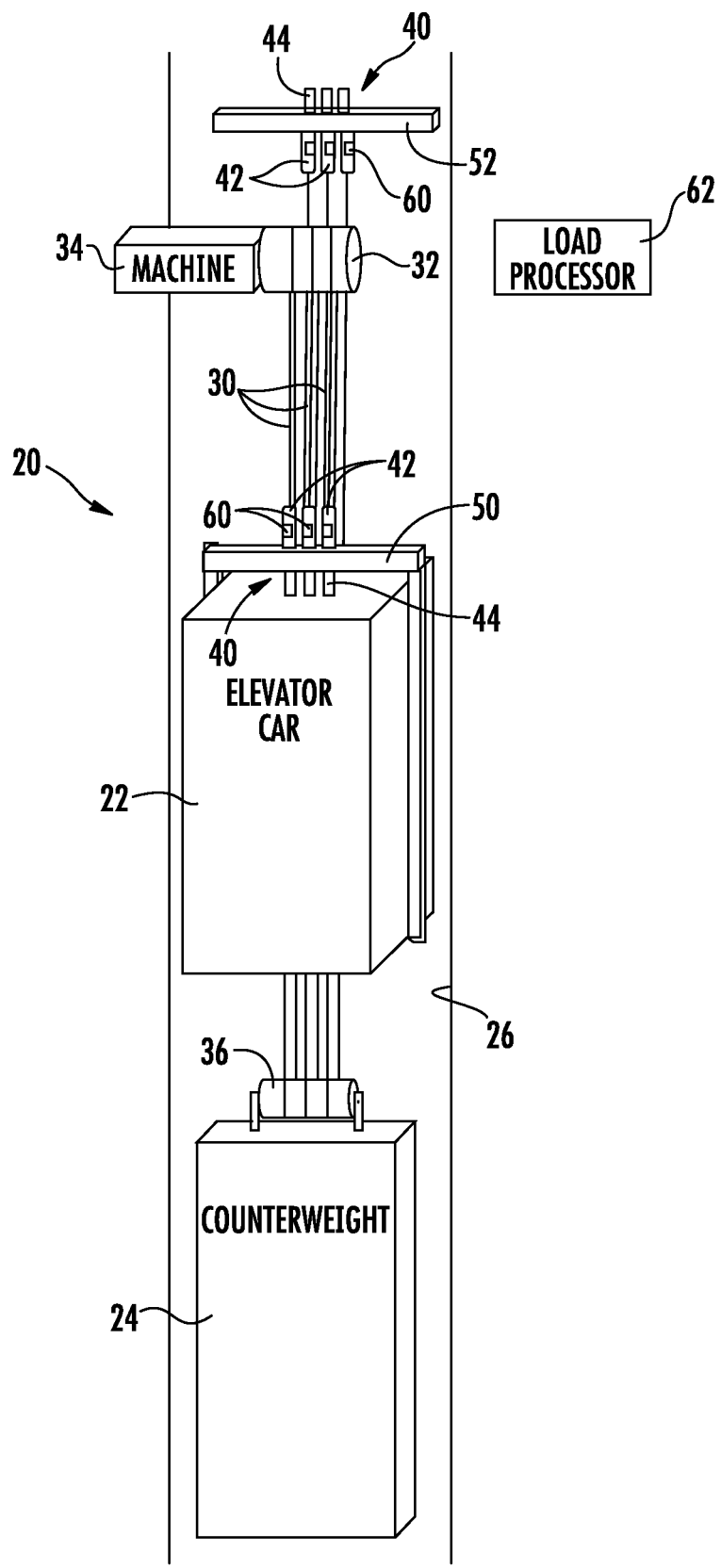
FIG. 1 diagrammatically illustrates selected portions of an elevator system designed according to an embodiment of this invention.

FIG. 1 diagrammatically illustrates selected portions of an elevator system 20. An elevator car 22 and counter weight 24 are situated within a hoistway 26 for movement within the hoistway 26 in a generally known manner. A plurality of load bearing members 30 couple the elevator car 22 to the counter weight 24. The load bearing members 30 in some embodiments comprise flat belts. In other embodiments, the load bearing members comprise round ropes. In embodiments including flat belts, the load bearing members 30 include tension members at least partially encased within a jacket. Some example tension members comprise steel cords. Other tension members comprise carbon fibers. Embodiments including round ropes may include round steel ropes or round ropes made of a synthetic or carbon fiber material including a jacket coating.

In the illustrated arrangement, the load bearing members 30 wrap around a traction sheave 32 that is selectively moved by a machine 34 to cause movement of the load bearing members 30 and associated movement of the elevator car 22. The load bearing members 30 also wrap around an idler sheave 36 associated with the counter weight 24.

Ends of the load bearing members 30 are secured by terminations 40. The terminations 40 each have a socket portion 42 and a thimble rod 44. In the illustrated example, some of the terminations 40 are secured to a cross beam 50 of the elevator car 22 while others of the terminations 40 are secured to a hitch plate 52 that is in a selected position within the hoistway 26. Other roping arrangements are useful for some embodiments of this invention.

The example system 20 includes a plurality of strain gages 60 respectively secured to a portion of respective ones of the plurality of terminations 40. The strain gages 60 provide an output or indication to a load processor 62 that is configured or programmed to determine a load on the elevator car 22 from the indications from the strain gages 60. In the example embodiment the strain gages 60 have a high sensitivity to minor deflections or changes in the portion of the termination 40 to which the strain gage 60 is secured. The strain gages 60 are situated, for example, on portions of the termination 40 that provide a linear response that can be detected by the strain gage 60.

Figure 2:
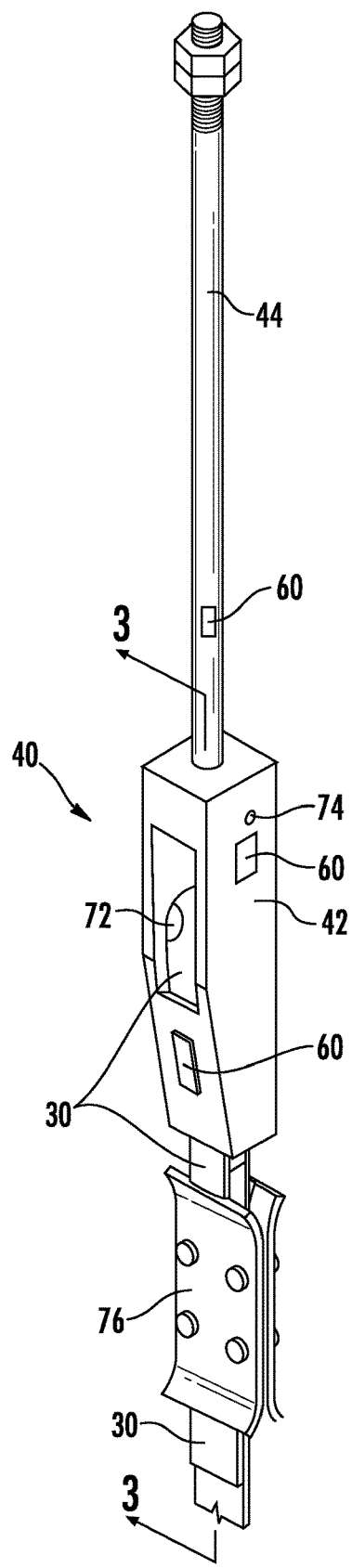
FIG. 2 diagrammatically illustrates an example termination designed according to an embodiment of this invention.
Figure 3:
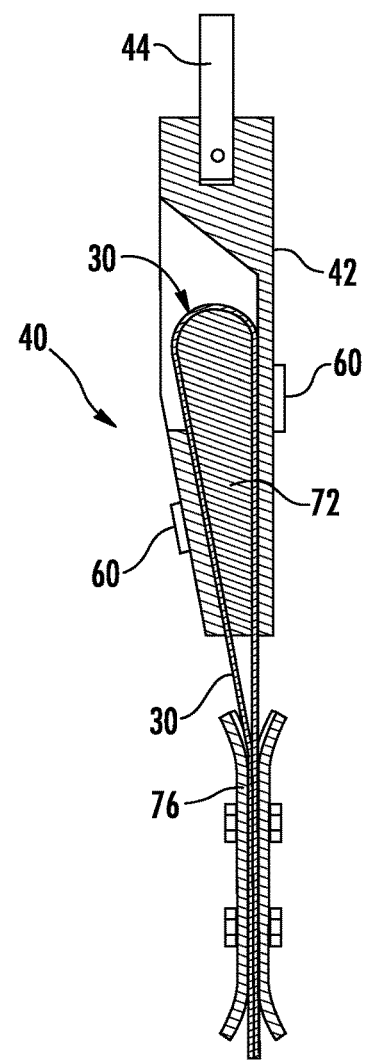
FIG. 3 is a cross-sectional illustration of the example termination of FIG. 2 taken along the lines 3-3.

FIGS. 2 and 3 illustrate an example termination 40 that includes strain gages 60 situated for providing an indication of the load on the elevator car 22. The example termination 40 includes a thimble rod 44 with a strain gage 60 situated on the thimble rod 44. The load on the thimble rod 44 allows for a highly sensitive strain gage 60 to provide an output that can be interpreted by the load processor 62 as an indication of the load on the elevator car 22 as experienced by the load bearing member 30 associated with that termination 40.

The socket portion 42 includes multiple planar portions 70. A wedge 72 is situated within the socket portion 42 for securing an end of the load bearing member 30 within the termination 40. A connector 74 establishes a connection between the thimble rod 44 and the socket portion 42. The illustrated example includes clamping members 76 on the portions of the load bearing member 30 that are just outside the socket 42. The wedge 72, socket 42 and clamping members 76 work in a known manner.

In such an example embodiment, a strategic location of the strain gages 60 provides a reliable indication of load on the elevator car 22 as experienced by the load bearing member 30 associated with that termination 40. As shown in FIG. 2, one location for the strain gages 60 is on the planar portions 70 of the socket portion 42. The planar portions 70 experience a load in a direction of the tension on the load bearing member 30 caused by the load or weight of the elevator car. One of the strain gages in the illustrated embodiment is near the connector 74, which is an area of the corresponding planar portions 70 that tends to have a concentration of force on the socket 42 in response to the load borne by the load bearing member 30.

While the embodiment shown in FIGS. 2 and 3 includes multiple strain gages 60 on an individual termination other embodiments include only one strain gage for each termination. If multiple strain gages are provided on each termination, the load processor 62 is able to recognize each strain gage to identify which load indication is coming from which termination 40. The load processor 62 may use multiple strain gage outputs from a single termination to determine an average, for example, of those outputs for purposes of determining the load at that termination.

The load processor 62 utilizes load indications from the strain gages 60 of the plurality of terminations 40 for determining a load on the elevator car. In some example embodiments the car 22 is loaded with known amounts of weight and the load processor 62 learns how the strain gage indications correspond to the weight. Other methods of processor training or strain gage calibration may be used in other embodiments.

In one embodiment, the load processor 62 receives an individual load indication corresponding to each of the load bearing members 30 from at least one strain gage 60 secured to the respective termination 40 connected to the respective load bearing members 30. The load processor 62 in such an embodiment determines a total of all the load indications to determine the total load on the elevator car 22.

In an example embodiment the load processor 62 is programmed or configured to determine whether the individual loads associated with each of the load bearing members 30 are different from each other. The load processor 62 is configured to determine whether the load on the elevator car 22 is generally equally distributed among the load bearing members 30. If a difference between the loads borne by the different load bearing members 30 is outside of a desirable, predetermined range, the load processor 62 is configured to provide an indication that alerts maintenance personnel to make an adjustment to the termination assembly, for example, to achieve a more equal load distribution.

One feature of utilizing strain gages on terminations for determining the load on the elevator car 22 is that it does not require load sensors on the elevator car, itself. Additionally, the example embodiments are useful for elevator systems that include load bearing members that are relatively high strength and stiff. For example, carbon fiber belts tend to be stiffer than belts that have steel cord tension members within a jacket. Such stiffer load bearing members introduce different characteristics within an elevator system and the example embodiments allow for accurately determining load on an elevator car in such elevator systems.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An assembly for determining a load on an elevator car, the assembly comprising:
  a plurality of terminations respectively configured for securing an end of a load bearing member, the plurality of terminations respectively including a rod, a socket portion connected to the rod, and a wedge situated at least partially within the socket portion, wherein the socket portion includes at least one solid member that extends in a direction of the load on the elevator car;
  a plurality of strain gages respectively secured to a portion of respective ones of the plurality of terminations, wherein each of the terminations includes at least one of the strain gages, wherein the strain gages are situated on the at least one solid member of the respective terminations; and a load determining processor that receives indications from the plurality of strain gages and determines a load on the elevator car based on the received indications.

2. The assembly of claim 1, wherein the load determining processor determines a load value corresponding to a strain gage indication for each of the plurality of terminations; and the load on the elevator car from a total of the determined load values.

3. The assembly of claim 1, wherein the load determining processor determines whether the load on the elevator car is equally distributed among the respective load bearing members.

4. An elevator system, comprising:

an elevator car;

a plurality of load bearing members suspending the elevator car;

a plurality of terminations respectively securing an end of a respective one of the load bearing members, the plurality of terminations respectively including a rod, a socket portion connected to the rod, and a wedge situated at least partially within the socket portion, wherein the socket portion includes at least one solid member that extends in a direction of the load on the elevator car;

a plurality of strain gages respectively secured to a portion of respective ones of the plurality of terminations, wherein each of the terminations includes at least one of the strain gages, wherein the strain gages are situated on the at least one solid member of the respective terminations; and a load determining processor that determines a load on the elevator car from indications from the strain gages, the indications corresponding to a load on the respective one of the load bearing members.

5. The elevator system of claim 4, wherein the load determining processor determines a load value corresponding to a strain gage indication for each of the load bearing members; and the load on the elevator car from a total of the determined load values.

6. The elevator system of claim 4, wherein the load determining processor determines whether the load on the elevator car is equally distributed among the respective load bearing members.

7. The elevator system of claim 4, wherein the load bearing members comprise belts having carbon fiber tension members within a jacket.

8. The elevator system of claim 4, wherein the elevator car is situated in a hoistway;

the hoistway includes a hitch plate in a selected position in the hoistway; and the terminations are secured to the hitch plate.

9. The elevator system of claim 4, wherein the elevator car includes a cross beam; and the terminations are secured to the cross beam.

10. The elevator system of claim 4, comprising a machine and wherein the plurality of load bearing members move responsive to operation of the machine to cause movement of the elevator car.

11. The elevator system of claim 4, wherein the load determining processor determines an average of a plurality of strain gage outputs from one of the terminations for determining a load at the one of the terminations.

12. The assembly of claim 1, wherein the load determining processor determines an average of a plurality of strain gage outputs from one of the terminations for determining a load at the one of the terminations.

* * * * *